United States Patent
Quintero et al.

(10) Patent No.: US 10,858,576 B2
(45) Date of Patent: Dec. 8, 2020

(54) SELECTION OF OPTIMAL SURFACTANT BLENDS FOR WATERFLOOD ENHANCEMENT

(71) Applicants: Lirio Quintero, Houston, TX (US); Henry Nguyen, Houston, TX (US); Oleksandr V. Kuznetsov, Manvel, TX (US)

(72) Inventors: Lirio Quintero, Houston, TX (US); Henry Nguyen, Houston, TX (US); Oleksandr V. Kuznetsov, Manvel, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/354,510

(22) Filed: Mar. 15, 2019

(65) Prior Publication Data

US 2019/0284466 A1    Sep. 19, 2019

Related U.S. Application Data

(60) Provisional application No. 62/644,807, filed on Mar. 19, 2018.

(51) Int. Cl.
*C09K 8/584* (2006.01)
*C09K 8/84* (2006.01)
(Continued)

(52) U.S. Cl.
CPC .............. *C09K 8/584* (2013.01); *C09K 8/845* (2013.01); *E21B 49/088* (2013.01); *E21B 49/0875* (2020.05)

(58) Field of Classification Search
CPC ........ C09K 8/584; C09K 8/524; C09K 8/594; C09K 8/604; C09K 8/588; E21B 43/16;
(Continued)

(56) References Cited

U.S. PATENT DOCUMENTS

| | | |
|---|---|---|
| 6,065,541 A | 5/2000 | Allen |
| 2011/0190174 A1* | 8/2011 | Weerasooriya .... C08G 65/2612 |
| | | 507/254 |

(Continued)

FOREIGN PATENT DOCUMENTS

| | | | |
|---|---|---|---|
| EP | 3000862 A1 | 3/2016 | |
| WO | WO-2011149789 A1 * | 12/2011 | ........... C07C 303/06 |

OTHER PUBLICATIONS

International Search Report for International Application No. PCT/US2019/022786, International Filing Date Mar. 18, 2019, dated Jun. 24, 2019, 3 pages.

(Continued)

*Primary Examiner* — Zakiya W Bates
(74) *Attorney, Agent, or Firm* — Cantor Colburn LLP (57) ABSTRACT

A method of providing an optimal surfactant blend to improve waterflood efficiency comprises selecting candidate surfactant blends based on one or more of the following: a reservoir condition; information of a crude oil; information of an injection fluid; or information of a formation fluid, each candidate surfactant blends comprising at least two surfactants, one surfactant having a higher relative affinity for the crude oil than for the injection fluid and at least one surfactant having a higher affinity for the injection fluid than for the crude oil; evaluating phase behavior of the candidate surfactant blends to select surfactant blends that form a Winsor III system with the crude oil and the injection fluid at a reservoir temperature; and evaluating the selected surfactant blends in a porous media to select an optimal surfactant blend which achieves at least an additional 10% crude oil recovery after waterflood.

19 Claims, 3 Drawing Sheets

(51) Int. Cl.
    *E21B 49/08* (2006.01)
    *E21B 43/22* (2006.01)
(58) Field of Classification Search
    CPC ...... E21B 43/26; E21B 43/164; E21B 43/166;
    E21B 43/25
    See application file for complete search history.

(56) References Cited

U.S. PATENT DOCUMENTS

2016/0319663 A1    11/2016    Natali
2017/0322132 A1    11/2017    Potty et al.

OTHER PUBLICATIONS

Negin, Chegenizadeh et al., "Most common surfactants employed in chemical enhanced oil recovery", Petroleum, 2017, vol. 3, No. 2, pp. 197-211.
Written Opinion for International Application No. PCT/US2019/022786, International Filing Date Mar. 18, 2019, dated Jun. 24, 2019, 4 pages.

* cited by examiner

SELECTION OF OPTIMAL SURFACTANT BLENDS FOR WATERFLOOD ENHANCEMENT

CROSS REFERENCE TO RELATED APPLICATIONS

This application claims the benefit of an earlier filing date from U.S. Provisional Application Ser. No. 62/644,807 filed Mar. 19, 2019, the entire disclosure of which is incorporated herein by reference.

BACKGROUND

Crude oil production can include several stages. During the primary recovery stage, the natural pressure of the reservoir drives oil into the wellbore and up to the surface. When primary recovery stage reaches its limit, water, gas, or various chemicals can be injected to displace oil and drive it to a production wellbore during secondary or tertiary recovery. During any stage of reservoir production, enhanced oil recovery (EOR) techniques can be used to increase the amount of crude oil that can be extracted from the reservoir. There are several techniques for EOR—surfactant-enhanced waterflood (SEW) is one of them. In a SEW method, enhanced oil recovery is achieved by injecting a small amount of appropriate surfactant with injection water or brine. An appropriate surfactant can reduce the interfacial tension that prevents oil droplets from moving through a reservoir. Surfactant-enhanced waterflood requires optimization of surfactants for maximum effect. Accordingly, there is a need in the art for methods that are effective to identify optimal surfactants for waterflood enhancement.

BRIEF DESCRIPTION

A method of providing an optimal surfactant blend to improve waterflood efficiency comprises selecting candidate surfactant blends based on one or more of the following: a reservoir condition; information of a crude oil; information of an injection fluid; or information of a formation fluid, each candidate surfactant blends comprising at least two surfactants, one surfactant having a higher relative affinity for the crude oil than for the injection fluid and at least one surfactant having a higher affinity for the injection fluid than for the crude oil; evaluating phase behavior of the candidate surfactant blends to select surfactant blends that form a Winsor III system with the crude oil and the injection fluid at a reservoir temperature; and evaluating the selected surfactant blends in a porous media to select an optimal surfactant blend which achieves at least an additional 10% crude oil recovery after waterflood.

A method of enhancing waterflood efficiency in oil recovery comprises providing an optimal surfactant blend in accordance with a method as described herein above; combining the optimal surfactant blend with the injection fluid to form a surfactant-containing injection fluid; and injecting the surfactant-containing injection fluid into the reservoir to enhance waterflood efficiency in oil recovery.

BRIEF DESCRIPTION OF THE DRAWINGS

A description of the figures, which are meant to be exemplary and not limiting, is provided in which.

DETAILED DESCRIPTION

The mobilization of the residual oil trapped in a reservoir is governed by the capillary number (Ca) correlation. The capillary number is defined as the ratio between the viscous forces and the capillary forces, and can be calculated based on Equation 1:

$$Ca = \frac{\text{Viscous forces}}{\text{capillary forces}} = \frac{v * \mu}{\gamma * \cos\theta} \quad \text{(Equation 1)}$$

In Equation 1, $\gamma$ is the interfacial tension between the crude oil and the injection fluid used to displace the crude oil; $\theta$ is the contact angle between the rock and the injection fluid; $\mu$ is the viscosity of the injection fluid; and v is the velocity of the injection fluid. The capillary number (Ca) can be increased by using an appropriate surfactant blend to decrease the interfacial tension ($\gamma$) by various orders of magnitude. Surfactant blends that form a Winsor III system in the oil-water-surfactant phase behavior produce a reduction of various orders of magnitude in the crude oil/water interfacial tension. A Winsor III system is obtained when the selected surfactants form a middle phase in equilibrium with excess water and excess oil at a specific temperature.

Surfactant flooding is a process where a surfactant is added to an injection fluid, typically an aqueous fluid such as water or brine, to improve oil recovery by reducing the surface tension between the crude oil and the injection fluid and/or altering the wettability of porous rocks.

Methods are disclosed herein to select optimal surfactant blends for surfactant flooding. The methods take into consideration the information of the reservoir, the crude oil, the formation fluid, and the injection fluid. The optimal surfactant blends contain at least two surfactants: one very hydrophilic surfactant (first surfactant) together with a less hydrophilic or a lipophilic surfactant (second surfactant) relative to the optimum hydrophilic-lipophilic affinity of each specific crude oil. A proper selection of the surfactant combination includes an appropriate ratio between the more hydrophilic and less hydrophilic surfactants provide required surfactant affinity difference to obtain maximum oil solubilization or near-zero free energy in the crude oil-surfactant-water system. When a near-zero free energy is reached, it eliminates capillary effects and the trapping forces responsible for retaining large quantities of the original oil-in-place in the reservoir, thus the crude oil recovery factor increases.

Using the optimal surfactant blends can improve the efficiency of waterflood. In an embodiment, the optimal surfactant blends can achieve at least an additional 10%, at least additional 20%, at least an additional 30%, or at least an additional 10% to 30% crude oil recovery for a reservoir that has been subjected to waterflood. Initially individual candidate surfactants and/or candidate surfactant blends are pre-selected based on reservoir conditions, crude oil information, injection fluid information, and/or formation fluid information.

Injection fluid information and the production fluid information independently include one or more of the following: hardness; salinity; pH; a composition of the anions in the fluid; or a composition of the cations in the fluid. The formation fluid and the injection fluid can be characterized by methods known to a person skilled in the art.

The crude oil information includes an acid number; a viscosity; a density; an equivalent alkane carbon number; a composition of the crude oil; or the like. Equivalent alkane number (EACN) of the crude oil can be measured. Methods of determining EACN are described, for example, in Journal of Surfactants and Detergents, 20:3-19 (2017). All the other crude oil information can also be determined by a person skilled in the art using known methods.

Reservoir information includes reservoir temperatures, reservoir pressures, rock properties, and the like.

Depending on the reservoir conditions and the information about the crude oil, the injection fluid, and the formation fluid, candidate surfactant blends can be selected. In an embodiment, selecting candidate surfactant blends is based on a reservoir temperature; an equivalent alkane carbon number of the crude oil; or a salinity of the injection fluid; or the like.

The candidate surfactant blends include a hydrophilic surfactant (first surfactant) and a less hydrophilic or lipophilic surfactant (second surfactant) relative to the optimum hydrophilic-lipophilic affinity of the crude oil for a specific reservoir. The candidate surfactant blends can also include three or more surfactants.

One way to identify the affinity of the lipophilic surfactant and the hydrophilic surfactant is blending a surfactant with the crude oil and the injection fluid to form a system having an aqueous phase, an oil phase, and a middle interface layer between the aqueous phase and the oil phase, wherein the interface layer comprises a major part of the surfactant. As used herein, "a major part" means greater than about 50 wt %, greater than about 60 wt %, greater than about 70 wt %, or greater than 80 wt % of the surfactant is present in the interface layer between the aqueous phase and the oil phase. A hydrophilic surfactant has greater affinity towards the injection liquid than the crude oil. Thus a concentration of the hydrophilic surfactant in the interface layer decreases from a first portion approximate the aqueous phase towards a second portion away from the aqueous phase. On the other hand, a lipophilic surfactant has greater affinity towards the crude oil than the injection liquid. Thus a concentration of the lipophilic surfactant in the interface layer increases from a first portion approximate the aqueous phase towards a second portion away from the aqueous phase.

Suitable surfactants that may be used are not particularly limited and can be anionic surfactants, cationic surfactants, nonionic surfactants, and zwitterionic surfactants.

Exemplary nonionic surfactants include alkyl polyglycosides, sorbitan esters, polyglycol esters, methyl glucoside esters, or alcohol ethoxylates. Alcohol ethoxylates are also referred to as alkyl ethoxylates, which are condensation products of aliphatic alcohols with from about 0 to about 25 moles of ethylene oxide. The alkyl chain of the aliphatic alcohol can either be straight or branched, primary or secondary, and generally contains from about 6 to about 22 carbon atoms.

Exemplary anionic surfactants include alkali metal alkyl sulfates, alkyl or alkylaryl sulfonates, linear or branched alkyl ether sulfates and sulfonates, alcohol polypropoxylated and/or polyethoxylated sulfates, alcohol polypropoxylated and/or polyethoxylated carboxylates, alkyl or alkylaryl disulfonates, alkyl disulfates, sulfobetaines, alkyl sulphosuccinates, alkyl ether sulfates, linear and branched ether sulfates, or combinations comprising at least one of the foregoing.

In specific embodiments, the anionic sulfonate, sulfate, and carboxylated surfactants have a hydrophobic chain of about 4 to about 40 carbon atoms, about 15 to about 30 carbon atoms, or about 20 to 25 carbon atoms. The anionic sulfonate surfactants can comprise an internal olefin or alcohol alkoxy sulfate. By "an internal olefin" is meant the molecule comprises an equilibrium mixture of double bonded isomers. Exemplary specific anionic sulfonate, sulfate, and carboxylated surfactants include, but are not necessarily limited to, internal olefin sulfonates, alcohol alkoxy sulfates, alcohol ethoxylated sulfates, alcohol propoxylated-ethoxylated sulfates, alkane sulfonates, alcohol propoxylated-ethoxylated sulfonated, alcohol polypropoxylated-ethoxylated carboxylated, alcohol ethoxylated carboxylated, and alcohol ethoxylated sulfonated.

Exemplary cationic surfactants include quaternary ammonium compounds (e.g. polyglycol ether ammonium methyl chloride), arginine methyl esters, alkanolamines and alkylenediamines.

Candidate surfactants may also include so-called extended surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

The candidate surfactant blends can also further include a mutual solvent, a co-solvent, a linker, an alkali chemical, a polymer, or a combination comprising at least one of the foregoing.

As used herein, the term "mutual solvent" refers to a solvent that has solubility in both oil and water. In some embodiments, a mutual solvent may be substantially completely soluble in both oil and water while in other embodiments, a lesser degree of solubilization may be acceptable. The mutual solvents for the surfactant blends can include terpenes, ionic liquids, synthetic solvents such as methyl ester solvents and solvents produced by metathesis catalyst technology.

Co-solvents for the surfactant blends include glycol ethers, which can include ethylene glycol mono-butyl ether, dipropylene glycol mono-methyl ether, propylene glycol ethers, methyl 2-pyrrolidone, as well as other co-solvents such as methanol, isopropyl alcohol, butanol, pentanol, hexanol, isooctyl alcohol and their isomers, $C_{1-8}$ alcohol blends, and the like, and combinations thereof.

A "linker" is an additive which "sticks to" or "associates with" the surfactant and links it with the molecules in the bulk phase, and hence increase the "reach" of the surfactant molecules which are adsorbed at interface, thus enhancing their performance. A lipophilic linker (the most important in practice) prolongates the tail of the surfactant. The result is similar to giving the surfactant a longer tail, hence a better interaction with the oil and a higher solubilization is achieved. The linker may be any acid. Exemplary linkers include citric acid, unsaturated and saturated fatty acid such as oleic acid, linoleic acid, palmitoleic acid; palmitic acid, stearic acid; organic acids such as formic acid, acetic acid, oxalic acid; inorganic acids such as hydrochloric acid, phosphoric acid; inorganic acidic salt, or organic acid salt.

"Polymers" refer to those polymers that are used in polymer flooding and are usually water soluble and can increase the mobility of the crude oil. Exemplary polymers include starches and modified versions thereof, water soluble polysaccharides and modified versions thereof, water soluble celluloses and modified versions thereof, and water soluble polyacrylamides and copolymers thereof. Such polymers are known. Commonly used polymers include hydrolyzed polyacrylamide and xanthan.

"An alkaline chemical" refers to materials used in alkaline flooding. Alkaline chemicals can react with certain types of oils, forming surfactants inside the reservoir. Exemplary chemicals include sodium hydroxide, sodium orthosilicate, sodium carbonate, alkanolamine or a combination comprising at least one of the foregoing.

After the candidate surfactant blends are selected, the phase behavior of various water/oil/surfactant systems are evaluated. Each of the systems includes a candidate surfactant blend, a crude oil, and an injection fluid. Different systems can comprise the same two surfactants with different relative weight ratios. Alternatively, different systems can comprise different surfactants with same relative weight ratios. In an embodiment, a series of water/oil/surfactant systems are prepared where only one variable is progressively changed. Such variables include a ratio of the hydrophilic and hydrophobic surfactants, concentration of the surfactants, salinity, and the like.

A water/oil/surfactant system can form a Winsor I, Winsor II, or Windsor III system. In a Winsor Type I system, the surfactant forms an oil-in-water microemulsion in the aqueous phase. In a Winsor Type II system, the surfactant forms a water-in-oil emulsion in the oil phase. In a Winsor Type III system, also referred to as a three-phase system, the surfactant forms a microemulsion in a separate phase between the oil and aqueous phases. The phase between the oil and aqueous phases is a continuous layer containing surfactant, water and dissolved hydrocarbons.

The surfactant blends that are capable of forming a Winsor III system with injection fluid and crude oil are selected. Optionally the selected surfactant blends are further evaluated for interfacial tension. Interfacial tension can be calculated based on a theoretical relationship between solubilization ratio and interfacial tension derived by Huh (Huh 1979). Solubilization ratio refers to the volume of oil or water solubilized divided by the volume of surfactant on a 100% active basis. Solubilization ratio can be measure by a person skilled in the art with known methods. Interfacial tension can also be measured using a tensiometer. The surfactant blends that have a calculated or measured interfacial tension of less than about $10^{-3}$ mN/m are selected for further evaluation. The selected surfactant blends can also have high oil solubilization and short coalescence times.

The selected surfactant blends are further evaluated to identify which formulation is best in terms of high oil recovery and low surfactant retention. Oil recovery can be evaluated in a porous media such as a sand-pack cell, a coreflood unit, or a microfluidic channel, or the like. Adsorption or retention of the surfactant blends to the rocks can be evaluated under static and dynamic conditions. Static adsorption evaluation can be performed using injection water or injection brine with selected surfactant blends that are previously contacted with crushed rocks. Dynamic adsorption evaluation can be performed by measuring the residual surfactant in a coreflood effluent or a sand-pack cell effluent, for example, to track the surfactant concentration during the surfactant coreflood or sand-pack testing. The optimal surfactant blends can achieve at least an additional 10%, at least an additional 20%, or at least an additional 30%, or at least an additional 10% to 30% crude oil recovery after waterflood when evaluated in a sand pack or coreflood test. In addition, the optimal surfactant blends can have a retention of less than about 1 milligram or less than about 0.5 milligram per gram of the rock in the evaluated reservoir.

Simulation is performed to select the optimal surfactant blend. Simulation allows estimation of additional recovery factors for the reservoir, the production profile, and the economics of the project. A flow simulation can determine the recovery factor for various slug sizes and surfactant concentrations. Simulation involves evaluating the baseline of waterflood and the simulation of waterflood with surfactant. The variables involved in a simulation include: pore volume or slug size, surfactant concentration, water salinity and temperature. The injection patterns can also be varied to evaluate the effects of active component concentration and injection time (contact time) on oil recovery.

Once an optimal surfactant blend is identified, it can be used to improve waterflood efficiency. A method of enhancing waterflood efficiency comprises combining the optimal surfactant blend with an injection fluid such as an injection water or injection brine to form a flood fluid; and injecting the flood fluid into the reservoir to enhance oil recovery. The surfactant blend is present in an amount of about 0.1 wt. % to 3 wt. %, about 0.1 wt. % to about 2 wt. %, or about 0.1 wt. % to about 1 wt. %, each based on the total weight of the flood fluid. The flood fluid can be injected during a secondary recovery stage, a tertiary recovery stage, or a combination thereof. The method is particularly useful for reservoirs that are already subjected to water flooding.

In an embodiment, the reservoirs have medium and light crude oil (less than 100 cP, less than 20 cP or less than 5 cP viscosity at the reservoir temperature). The method can be effective to mobilize residual oil trapped at pore throats after an extensive waterflood.

EXAMPLES

Compositions of various surfactant formulations used in the examples are shown in Table 1.

TABLE 1

| Composition of Surfactant formulations | |
|---|---|
| Surfactant Formulation 1 | Surfactant 1/Surfactant 2: 40/60 by volume |
| Surfactant 1 | Alkyl ethoxylate |
| Surfactant 2 | Internal olefin sulfonate |
| Surfactant Formulation 2 | Surfactant 3/Surfactant 4/Surfactant 5: 38/42/20 by volume |
| Surfactant 3 | Alcohol alkoxy sulfate |
| Surfactant 4 | Alkane sulfonate |
| Surfactant 5 | Alcohol ethoxylate |

The interfacial tension between crude oil and brine was evaluated with each of the individual surfactants and with the blended surfactant formulations. The crude oil used for these tests has 37 API degree and a viscosity of 2.4 cP at 126° F. The brine used has 4.1% salinity and was prepared by mixing sodium chloride plus 1200 mg/L of divalent cations (calcium and magnesium). IFT between low-viscosity crude oil samples and injection water or brine was measured using a spinning drop tensiometer. The instrument was set to reach the specific reservoir temperature inside the chamber for each of the crude oil/brine systems evaluated. Surfactant solution was placed into a quartz capillary tube and a ~2 μL crude oil droplet was introduced using a micro-syringe. Each experiment was run until it reached equilibrium or the crude oil break was completely solubilized. Each test was run with a 1500 ppm concentration of surfactant at the reservoir temperature (63° C.).

Figure 1:
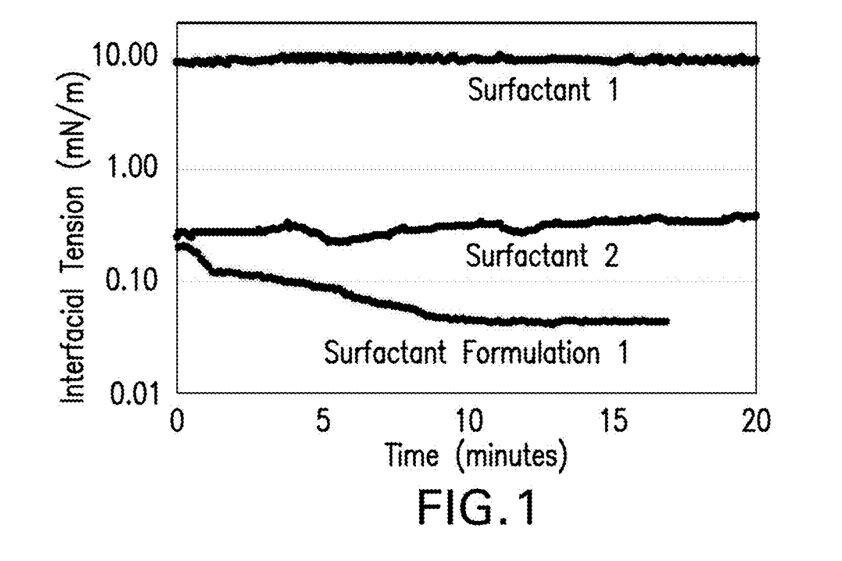
FIG. 1 shows the interfacial tension between crude oil and water for Surfactant 1, Surfactant 2, and a blend thereof (Surfactant Formulation 1), when measured at 63° C.

FIG. 1 shows the interfacial tension of Surfactant Formulation 1 measured at 145° F. This surfactant formulation is composed of a proportion of 40/60 surfactant 1/surfactant 2. Surfactant 2 is a surfactant with high affinity for the water phase (predominantly on the water side of the oil/water interface) for the particular crude oil/brine system evaluated. Surfactant 1 is a surfactant with more affinity for the oil phase than for the water phase for the particular crude oil/brine system evaluated. The combination of these two surfactants results in a synergistic surfactant formulation (surfactant formula 1) that produces a much lower interfacial tension than the individual surfactants.

Figure 5:
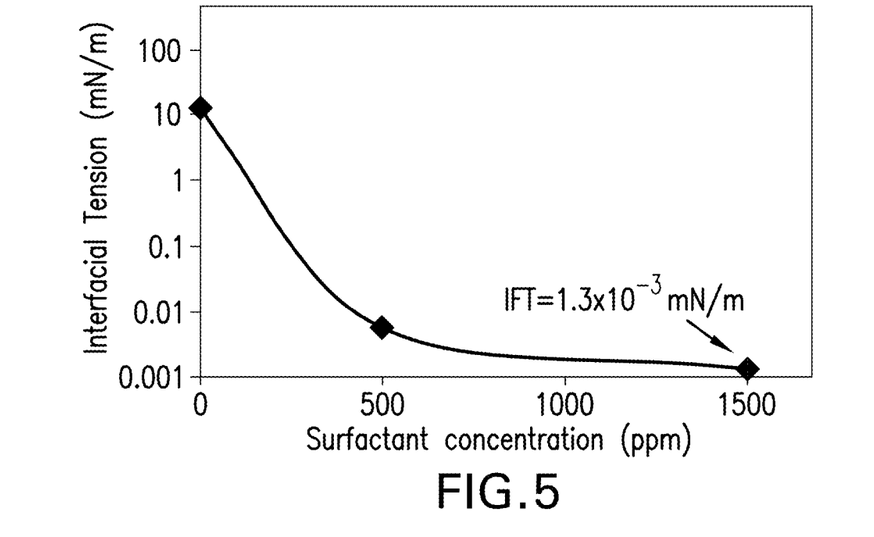
FIG. 5 shows the effects of the concentration of Surfactant Formulation 1 on interfacial tension between water and crude oil.

FIG. 5 shows the effects of surfactant concentration on the IFT for Surfactant Formulation 1. As shown in FIG. 5, the interfacial tension can be as low as $1.3 \times 10^{-3}$ mN/m when the Surfactant Formulation 1 is used at a concentration of 1.5 wt. %.

Figure 2:
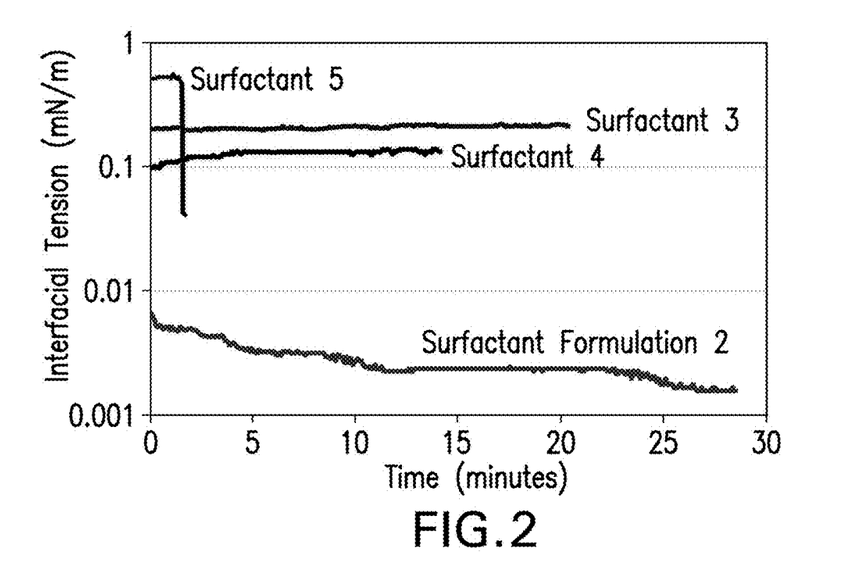
FIG. 2 shows the interfacial tension between crude oil and water for Surfactant 3, Surfactant 4, Surfactant 5, and a blend thereof (Surfactant Formulation 2), when measured at 63° C.

A second example is a surfactant blend with three surfactants. The interfacial tension of the individual surfactants and of Formulation 2 is shown in FIG. 2.

Formulation 2 is composed of two surfactants (surfactants 3 and 4) that have IFT in the order 0.1 mN/m or higher, and a third surfactant (surfactant 5), which shows a large IFT reduction in the first few minutes of the test, due to high solubilization. Surfactants 4 and 5 have high affinity for the water phase (predominantly on the water side of the oil/water interface) for the particular crude oil/brine system evaluated. Surfactant 3 has less affinity for the water than surfactants 4 and 5, and it has more affinity for the oil phase than the water phase used. The surfactant blend formulated with a combination of surfactants 3, 4 and 5 shows a very low IFT at the initial contact of the crude oil with the simulated injection water, and it reached approximately 0.002 mN/m within 10 minutes. As a reference, the IFT between the injection water and the crude oil was 11.1 mN/m.

Figure 3:
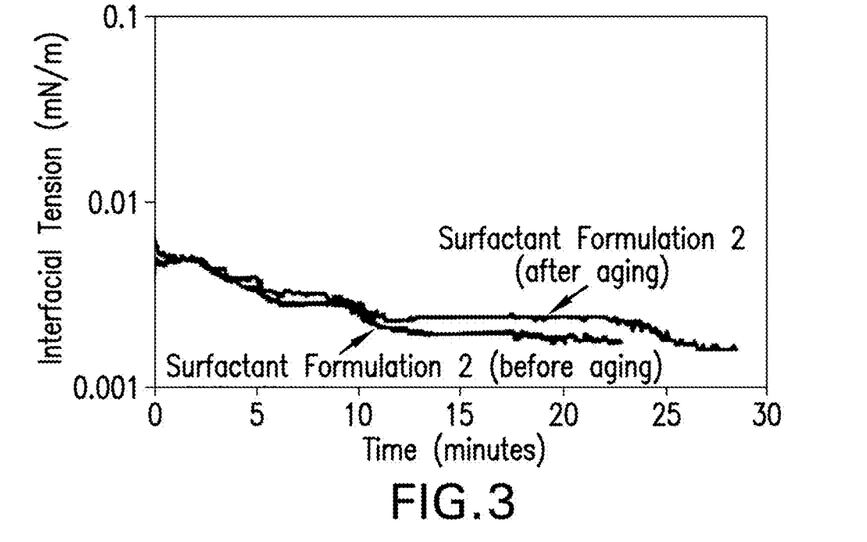
FIG. 3 shows the interfacial tension between crude oil and water for Surfactant Formulation 2, measured before aging and after aging in brine at 63° C. for eight weeks.

The method used to formulate the surfactant blends produces very stable formulations, as demonstrated by the evaluation of IFT as function of time. FIG. 3 shows the IFT measurements for Surfactant Formulation 2 between the crude oil and injection brine, before aging and after two months of aging at 63° C. Minimal change in the IFT indicates that the formulation is very robust and no degradation occurred due to prolonged exposure to brine and heat.

Figure 4:
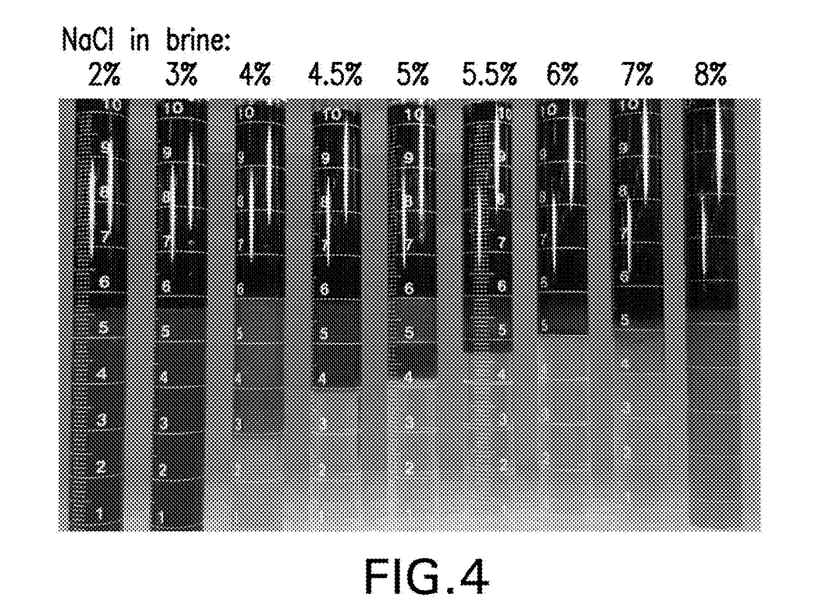
FIG. 4 shows the effects of salinity on phase behavior of Surfactant Formulation 2/brine/crude oil systems.

FIG. 4 shows the results of the effect of salinity on phase behavior of surfactant Formulation 2 with brine and crude oil. The optimum phase behavior is seen in the range between 4% and 5% of NaCl. The optimum phase behavior corresponds to an oil/water/surfactant system where the middle phase has the maximum volume of water and oil solubilized. At that condition of maximum solubilization, the lowest interfacial tension is obtained.

Figure 6:
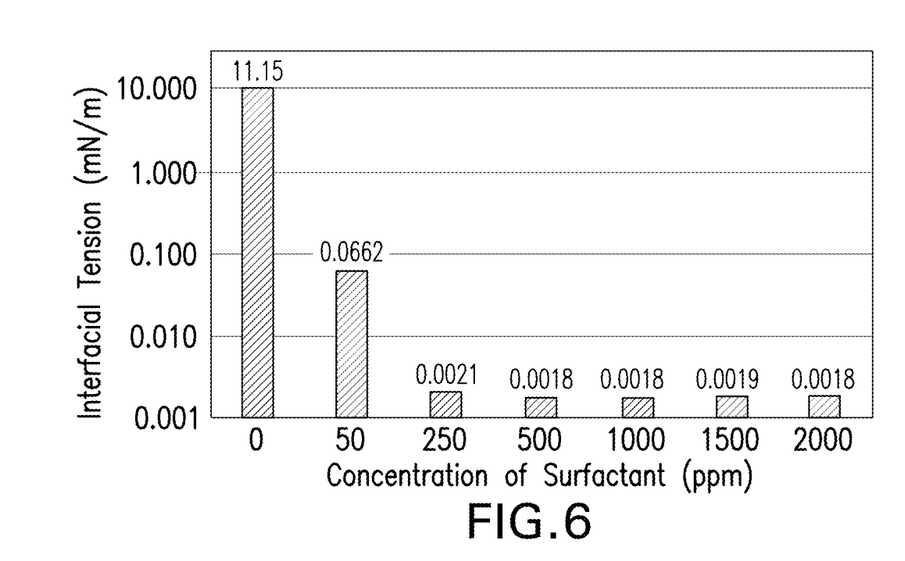
FIG. 6 shows the effects of the concentration of Surfactant Formulation 2 on interfacial tension between water and crude oil.

FIG. 6 shows the effects of surfactant concentration on the IFT for Surfactant Formulation 2. The data point at 0 ppm corresponds to the IFT between crude oil and injection brine without surfactant. The addition of the surfactant formulation makes a significant impact on IFT, decreasing it by various orders of magnitude at concentrations as low as 250 ppm. These results indicate that good performance can be obtained, even if part of the injected surfactant were lost by adsorption onto the rock.

Set forth are various embodiments of the disclosure.

Embodiment 1. A method of providing an optimal surfactant blend to improve waterflood efficiency, the method comprising: selecting candidate surfactant blends based on one or more of the following: a reservoir condition; information of a crude oil; information of an injection fluid; or information of a formation fluid, each candidate surfactant blends comprising at least a first surfactant which has a higher relative affinity for the crude oil than for the injection fluid and at least a second surfactant which has a higher relative affinity for the injection fluid than for the crude oil; evaluating phase behavior of the candidate surfactant blends to select surfactant blends that form a Winsor III system with the crude oil and the injection fluid at a reservoir temperature; and evaluating the selected surfactant blends in a porous media to select an optimal surfactant blend which achieves at least an additional 10% crude oil recovery after waterflood.

Embodiment 2. The method as in any prior embodiment, further comprising simulating reservoir waterflood with the optimal surfactant blend.

Embodiment 3. The method as in any prior embodiment, further comprising identifying the first surfactant and the second surfactant by blending a surfactant with the crude oil and the injection fluid to form a system having an aqueous phase, an oil phase, and an interface layer between the aqueous phase and the oil phase, wherein the interface layer comprises the surfactant.

Embodiment 4. The method as in any prior embodiment, wherein a concentration of the first surfactant in the interface layer decreases from a first portion approximate the aqueous phase towards a second portion away from the aqueous phase.

Embodiment 5. The method as in any prior embodiment, wherein a concentration of the second surfactant in the interface layer increases from a first portion approximate the aqueous phase towards a second portion away from the aqueous phase.

Embodiment 6. The method as in any prior embodiment, wherein the reservoir condition comprises one or more of the following: a reservoir temperature; a reservoir pressure; or a rock property.

Embodiment 7. The method as in any prior embodiment, wherein injection fluid information and the formation fluid information independently comprise one or more of the following: hardness; pH; a composition of anions; or a composition of cations.

Embodiment 8. The method as in any prior embodiment, wherein the crude oil information comprises one or more of the following: an acid number; a viscosity; a density; an equivalent alkane carbon number, or a composition of the crude oil.

Embodiment 9. The method as in any prior embodiment, wherein selecting candidate surfactant blends is based on one or more of the following: a reservoir temperature; an equivalent alkane carbon number of the crude oil; or a salinity of the injection fluid.

Embodiment 10. The method as in any prior embodiment, wherein the candidate surfactant blends further comprise one or more of the following: a mutual solvent; a co-solvent; a linker; an alkali chemical; or a polymer.

Embodiment 11. The method as in any prior embodiment, wherein the porous media comprises a sand-pack cell, a coreflood unit, or a microfluidic channel.

Embodiment 12. The method as in any prior embodiment further comprising evaluating adsorption of the selected surfactant blends.

Embodiment 13. A method of enhancing waterflood efficiency in oil recovery, the method comprising: providing an optimal surfactant blend as in any prior embodiment; combining the optimal surfactant blend with the injection fluid to form a surfactant-containing injection fluid; and injecting the surfactant-containing injection fluid into the reservoir to enhance waterflood efficiency in oil recovery.

Embodiment 14. The method of as in any prior embodiment, wherein the optimal surfactant blend further comprises one or more of the following: a mutual solvent; a co-solvent; a linker; an alkali chemical; or a polymer.

Embodiment 15. The method as in any prior embodiment, wherein the optimal surfactant blend is present in an amount of about 0.1 wt. % to 3 wt. % based on the total weight of the surfactant-containing injection fluid.

Embodiment 16. The method as in any prior embodiment, wherein the surfactant-containing injection fluid is injected during a secondary recovery stage, a tertiary recovery stage, or a combination thereof Embodiment 17. The method as in any prior embodiment, further comprising injecting water or a brine in the reservoir before injecting the surfactant-containing injection fluid.

Embodiment 18. The method as in any prior embodiment, wherein the crude oil has a viscosity of less than 100 cP or less than 20 cP at the reservoir temperature.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, water flooding includes brine flooding.

What is claimed is:

1. A method of providing an optimal surfactant blend to improve waterflood efficiency, the method comprising:
    selecting candidate surfactant blends, each candidate surfactant blends comprising at least a first surfactant which has a higher relative affinity for a crude oil than for an injection fluid and at least a second surfactant which has a higher relative affinity for the injection fluid than for the crude oil, wherein the candidate surfactant blends are selected based on one or more of the following: a reservoir condition; information of the crude oil; information of the injection fluid; or information of a formation fluid;
    evaluating phase behavior of the candidate surfactant blends to select surfactant blends that form a Winsor III system with the crude oil and the injection fluid at a reservoir temperature; and
    evaluating the selected surfactant blends in a porous media to select an optimal surfactant blend which achieves at least an additional 10% crude oil recovery after waterflood.

2. The method of claim 1, further comprising simulating reservoir waterflood with the optimal surfactant blend.

3. The method of claim 1, further comprising identifying the first surfactant and the second surfactant by blending a surfactant with the crude oil and the injection fluid to form a system having an aqueous phase, an oil phase, and an interface layer between the aqueous phase and the oil phase, wherein the interface layer comprises the surfactant.

4. The method of claim 3, wherein a concentration of the first surfactant in the interface layer decreases from a first portion approximate the aqueous phase towards a second portion away from the aqueous phase.

5. The method of claim 3, wherein a concentration of the second surfactant in the interface layer increases from a first portion approximate the aqueous phase towards a second portion away from the aqueous phase.

6. The method of claim 1, wherein the reservoir condition comprises one or more of the following: a reservoir temperature; a reservoir pressure; or a rock property.

7. The method of claim 1, wherein injection fluid information and the formation fluid information independently comprise one or more of the following: hardness; pH; a composition of anions; or a composition of cations.

8. The method of claim 1, wherein the crude oil information comprises one or more of the following: an acid number; a viscosity; a density; an alkane carbon number, or a composition of the crude oil.

9. The method of claim 1, wherein selecting candidate surfactant blends is based on one or more of the following: a reservoir temperature; an alkane carbon number of the crude oil; or a salinity of the injection fluid.

10. The method of claim 1, wherein the candidate surfactant blends further comprise one or more of the following: a mutual solvent; a co-solvent; a linker; an alkali chemical; or a polymer.

11. The method of claim 1, wherein the porous media comprises a sand-pack cell, a coreflood unit, or a microfluidic channel.

12. The method of claim 1 further comprising evaluating adsorption of the selected surfactant blends.

13. A method of enhancing waterflood efficiency in oil recovery in a reservoir, the method comprising:
    selecting candidate surfactant blends, each candidate surfactant blends comprising at least a first surfactant which has a higher relative affinity for a crude oil than for an injection fluid and at least a second surfactant which has a higher relative affinity for the injection fluid than for the crude oil, wherein the candidate surfactant blends are selected based on one or more of the following: a reservoir condition; information of the crude oil; information of the injection fluid; or information of a formation fluid;
    evaluating phase behavior of the candidate surfactant blends to select surfactant blends that form a Winsor III system with the crude oil and the injection fluid at a reservoir temperature;
    evaluating the selected surfactant blends in a porous media to select an optimal surfactant blend which achieves at least an additional 10% crude oil recovery after waterflood;
    combining the optimal surfactant blend with the injection fluid to form a surfactant-containing injection fluid; and injecting the surfactant-containing injection fluid into the reservoir to enhance waterflood efficiency in oil recovery.

14. The method of claim 13, wherein the optimal surfactant blend further comprises one or more of the following: a mutual solvent; a co-solvent; a linker; an alkali chemical; or a polymer.

15. The method of claim 13, wherein the optimal surfactant blend is present in an amount of about 0.1 wt. % to 3 wt. % based on the total weight of the surfactant-containing injection fluid.

16. The method of claim 13, wherein the surfactant-containing injection fluid is injected during a secondary recovery stage, a tertiary recovery stage, or a combination thereof.

17. The method of claim 13, further comprising injecting water or a brine in the reservoir before injecting the surfactant-containing injection fluid.

18. The method of claim 13, wherein the crude oil has a viscosity of less than 100 cP at the reservoir temperature.

19. The method of claim 18, wherein the crude oil has a viscosity of less than 20 cP at the reservoir temperature.

* * * * *